Patented Aug. 19, 1930

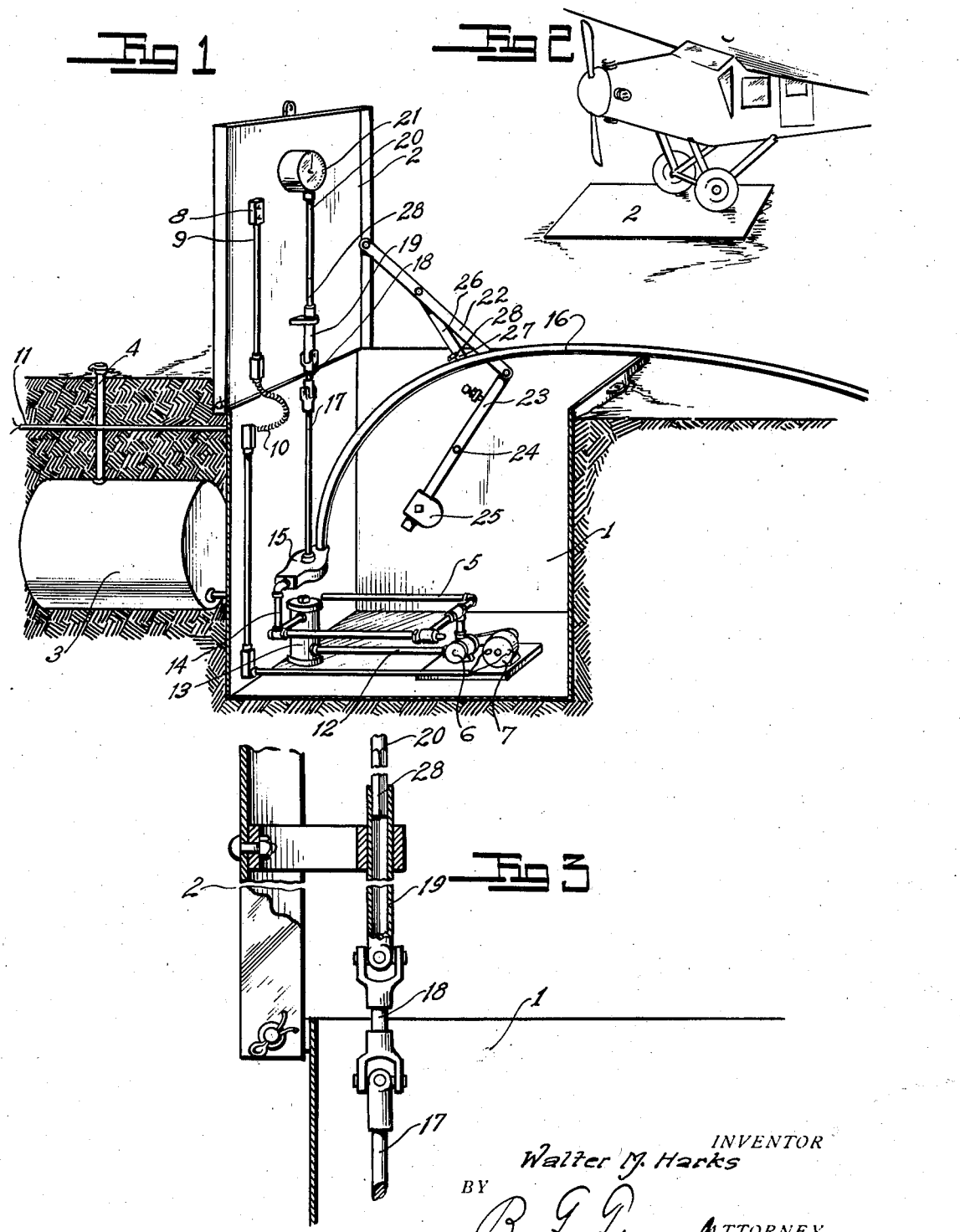

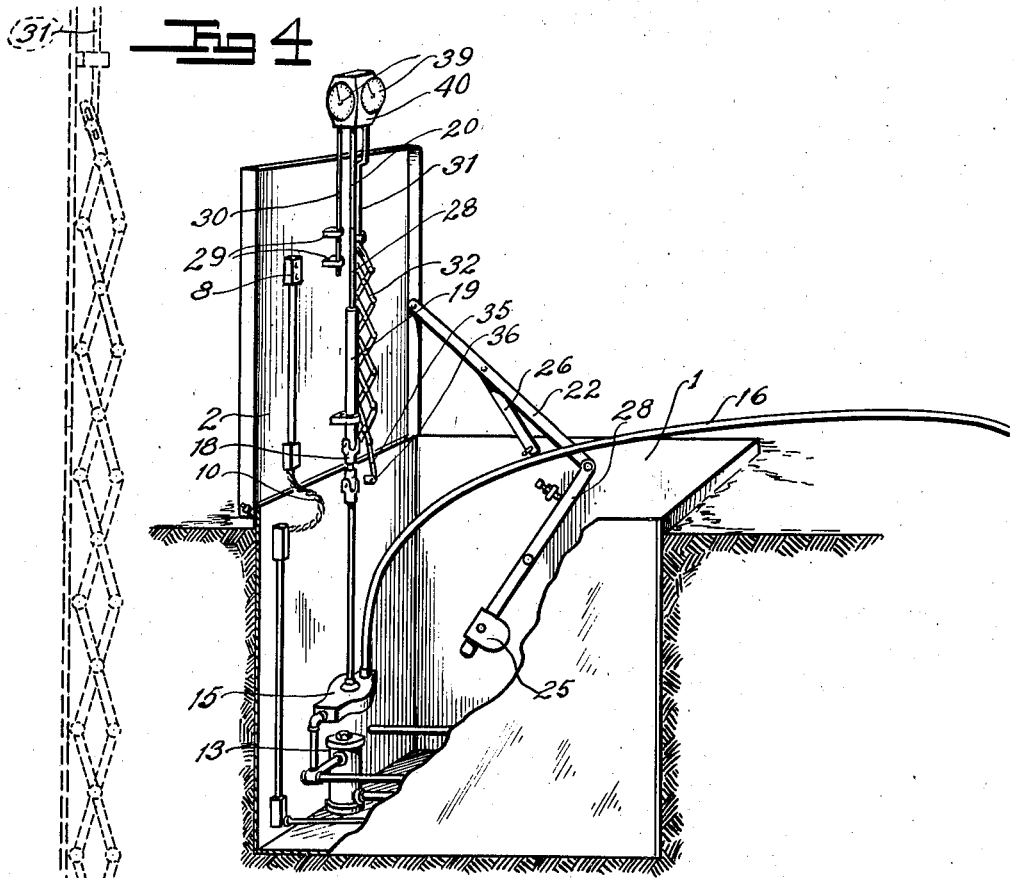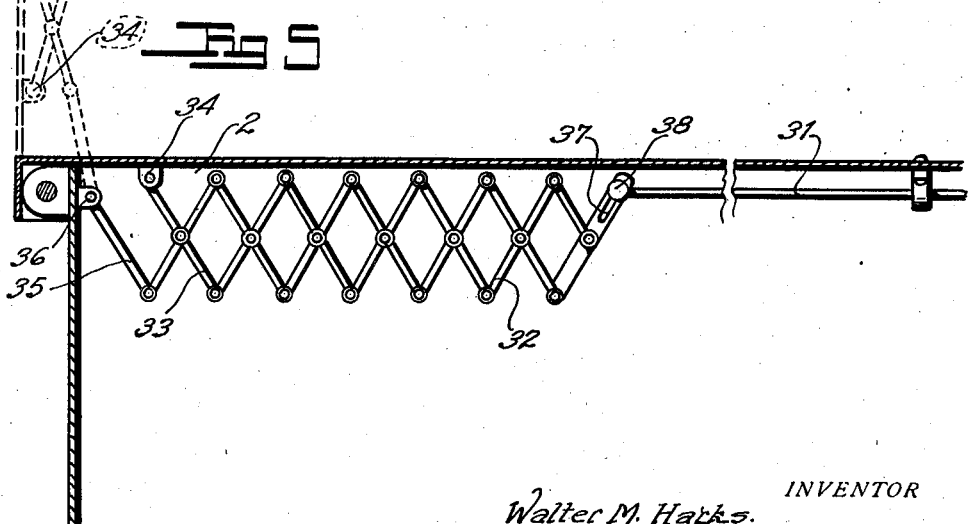

1,773,484

UNITED STATES PATENT OFFICE

WALTER M. HARKS, OF WICHITA, KANSAS, ASSIGNOR TO THE HAYES EQUIPMENT MANUFACTURING COMPANY, OF WICHITA, KANSAS

LIQUID-DISPENSING MECHANISM

Application filed July 8, 1929. Serial No. 376,726.

This invention relates to liquid dispensing devices and particularly to a liquid fuel dispensing device from which liquid hydrocarbon fuel can be dispensed in a convenient and expeditious manner.

The invention is primarily intended for use at airports and it is so constructed that the case containing the operating parts can be embedded in the ground so that when not in use, the mechanism within the case will be protected from injury by airplanes and the like. Ordinarily, fueling and refueling devices used at airports include a case embedded in the ground containing a considerable length of hose. If a meter is used, it can only be inspected through an opening in the case which necessitates the observer kneeling on the ground to observe the meter through the opening. Obviously, this is unsatisfactory.

My invention contemplates the provision of means whereby the operating apparatus may be fully protected by a case of substantial proportions embedded in the ground with the top of the case substantially flush with the surface of the ground. A lid hinged to the case carries the meter so that when the lid is swung back, the lid is visible and access to the case may be readily had. When not in use, the lid can be swung to a horizontal closing position fully protecting the contents of the case from injury by airplanes and the like.

The novelty of the invention will be apparent by reference to the following description in connection with the accompanying drawings in which:

Fig. 1 is a perspective view of the meter and associated mechanism in the case, the case being shown in section.

Fig. 2 is a view of the cover for the case closed and a plane thereon.

Fig. 3 is a view partly in elevation and partly in section of the drive mechanism for the meter and part of the cover.

Fig. 4 is a view partly in section and partly in perspective of a modified form of the device ready for use and Fig. 5 is a detailed view of the meter elevating means.

The reference numeral 1 designates a casing adapted to be embedded in the ground provided with a hinged cover 2. Liquid such as hydrocarbon fuel is preferably received in a tank 3 provided with a filler pipe 4. From the tank 3, the liquid may flow through the pipe 5 to a pump 6 driven by an electric motor 7 adapted to be started and stopped through a switch 8 controlling a circuit in the conduit 9, the part 10 of which is flexible. The circuit will receive energy from a suitable source through wires in the conduit 11. The liquid may be pumped through the pipe 12, through filter 13, through pipe 14, through a meter motor 15 out through the dispensing hose 16. As the meter motor rotates, it will turn a shaft 17 having a universal joint 18 at its upper end provided with a sleeve or socket 19 to receive the end of the meter indicator shaft 20 which will operate flow indicating mechanism in the indicated case 21 carried by the cover 2. The cover is relatively heavy so I provide a counterbalance consisting of the lever 22 hinged to the cover and connected to the lever 23 pivoted intermediate its ends as at 24 to the side of the case. The lower end of the lever 23 is provided with a counterbalance weight 25 so that very little effort will be required to raise or lower the cover 2. The lever 22 carries a pivoted brace bar 26 having a notch 27 to engage a pin 28 on the case to hold the cover in a vertical position when it is raised. When the parts are assembled with the lid or cover in the position shown in Figure 2, it is obvious that a plane, truck or the like may run over the dispensing device without injuring it.

When it is desired to furnish liquid, that is, to fuel a plane, motor vehicle or the like, the operator or attendant will raise the cover to the position shown in Figure 1 and inasmuch as the lower end of shaft 20 is angular as indicated at 28 to be slidingly received in the angular sleeve or socket 19. The shaft may slide independent of the socket 19 but it will have to rotate therewith. Consequently, when the operator closes the switch 8, the motor will start to operate to in turn operate the pump to flow liquid from the tank 3, through the meter motor 15 out through the dispensing hose 16, at the same time rotating the shaft 17 and shaft 20 to operate appropriate flow indicating mechanism in the casing 21 so that the purchaser as well as the attendant can be apprised of the amount of fluid that is flowing through the hose 16. As soon as the desired amount of liquid has been dispensed, the hose can be placed back in the casing and the lid swung down to the position shown in Figure 2. It will therefore be obvious that the device is particularly for use in airports or on landing fields and the like.

In Figures 4 and 5 I have shown a slightly modified form of the invention in which the construction conforms to that disclosed in the preferred form except that in fixing the meter indicator to the lid, it is slidably mounted in guides 29 on the cover by a rod 30 fixed to the case 40. Another rod 31 fixed to the case 40 is connected to a lazy-tongs 32, one leg 33 of which is fastened to the cover 2 at 34 and the other leg 35 of which is fastened to the case at 36. The upper end of the lazy-tongs carried a slotted bar 37 which is connected to the head 38 of rod 31 so that when the lid or cover is raised, the lazy-tongs will expand as shown in dotted lines in Figure 5 to raise the meter indicator above the cover and inasmuch as the indicator dials 39 are on all four sides of the case 40, the indicator will be visible from any angle. In so far as the general arrangement of the operating mechanism is concerned, however, the structure in Figures 4 and 5 conforms to the structure shown in Figure 1.

From the foregoing it will be apparent that the device is so constructed that an embedded liquid service apparatus may be provided at an airport or wherever expedient so that all of the parts will normally be protected against damage but whenever it is desired to service a plane or other apparatus, the cover can be swung to a position to render all of the parts readily accessible and easily visible.

What I claim and desire to secure by Letters-Patent is:—

1. In a device of the class described, a casing, a cover therefor, a liquid pumping mechanism in the casing, a meter indicator carried by the cover, a meter motor within the casing actuated by fluid from the liquid pumping mechanism and a flexible connection between the meter motor and the meter indicator.

2. In a device of the class described, a casing, a cover hinged thereto, a liquid pumping mechanism in the casing, a meter motor in the casing actuated by fluid from the liquid pumping mechanism, a meter indicator carried by the cover and a flexible connection between the meter motor and the meter indicator.

3. In a device of the class described, a casing, a cover hinged thereto, a liquid pumping mechanism in the casing, a meter motor in the casing actuated by fluid from the liquid pumping mechanism, a meter indicator carried by the cover and a flexible connection between the meter motor and the meter indicator, said connection comprising telescoping members.

4. In a device of the class described, a casing, a cover hinged thereto, a liquid pumping mechanism in the casing, a meter motor in the casing actuated by fluid from the liquid pumping mechanism, a meter indicator carried by the cover and a flexible connection between the meter motor and the meter indicator, said connection comprising telescoping members and a universal joint in one of the members.

5. In a device of the class described, a casing, a cover hinged thereto, a liquid pumping mechanism in the casing, a meter motor in the casing actuated by fluid from the liquid pumping mechanism, a meter indicator slidably carried by the cover, means for sliding the meter indicator with respect to the cover when the cover is raised and a driving connection between the meter motor and the meter indicator.

6. In a device of the class described, a casing, a cover hinged thereto, a liquid pumping mechanism in the casing, a meter motor in the casing actuated by fluid from the liquid pumping mechanism, a meter indicator slidably carried by the cover, a lazy-tongs connected to the cover and the meter indicator to raise the meter indicator when the cover is raised and a driving connection between the meter motor and the meter indicator.

7. In a device of the class described, a casing, a cover hinged thereto, a liquid pumping mechanism in the casing, a meter motor in the casing actuated by fluid from the liquid pumping mechanism, a meter indicator slidably carried by the cover, a lazy-tongs connected to the cover and the meter indicator to raise the meter indicator when the cover is raised and a sliding driving connection between the meter motor and the meter indicator.

8. In combination with a casing having a hinged cover, of a pumping mechanism within the casing, a flexible hose into which fluid is delivered by the pumping mechanism, a meter motor between the flexible hose and the pumping mechanism, a liquid flow indicator carried by the hinged cover, a shaft driven by the meter motor, an alining shaft for driving the indicator and a flexible connection between the two shafts.

In testimony whereof I affix my signature.

WALTER M. HARKS.